United States Patent [19]

Pairetti et al.

[11] Patent Number: 5,058,967
[45] Date of Patent: Oct. 22, 1991

[54] APPARATUS FOR MANIPULATING LASER BEAMS, PARTICULARLY POWER LASER BEAMS FOR USE BY ROBOTS

[75] Inventors: Bartolomeo Pairetti; Giorgio Marinoni, both of Turin, Italy

[73] Assignee: Comau S.p.A., Italy

[21] Appl. No.: 516,869

[22] Filed: Apr. 30, 1990

[30] Foreign Application Priority Data

Jun. 16, 1989 [IT] Italy ................ 67490 A/89

[51] Int. Cl.$^5$ ............................................. G02B 5/10
[52] U.S. Cl. .................................. 359/861; 359/862; 359/863; 359/225
[58] Field of Search ............... 350/624, 6.2, 6.3, 6.4, 350/6.6, 6.7, 486, 6.22, 6.23

[56] References Cited

U.S. PATENT DOCUMENTS

| | | | |
|---|---|---|---|
| 3,769,608 | 10/1973 | Vargady | 350/486 |
| 3,985,420 | 10/1976 | Grose | 350/486 |
| 3,993,402 | 11/1976 | Fredrick, Jr. | 350/486 |
| 4,367,017 | 1/1983 | Jimbou et al. | 350/624 |
| 4,547,041 | 10/1985 | Grosser | 350/486 |
| 4,806,728 | 2/1989 | Salzer et al. | 350/624 |

FOREIGN PATENT DOCUMENTS 3621716 1/1987 Fed. Rep. of Germany .
3036427 4/1987 Fed. Rep. of Germany .

Primary Examiner—Bruce Y. Arnold
Assistant Examiner—Hung Xuan Dang
Attorney, Agent, or Firm—Armstrong, Nikaido, Marmelstein, Kubovcik, and Murray

[57] ABSTRACT

In an apparatus for manipulating laser beams with mirrors, the beam is caused to emerge substantially in alignment with the initial direction of the incoming beam by deflecting the incoming beam with a first mirror whose position is selectively adjustable to a second mirror which preferably has a parabolic surface, and then from the second mirror the beam is directed to a third, flat mirror whose position is also adjustable so that the beam is focussed on the region to be treated in a position substantially in alignment with the initial direction of propagation. An improved system for supplying screening gas to the region under treatment is also disclosed.

20 Claims, 3 Drawing Sheets

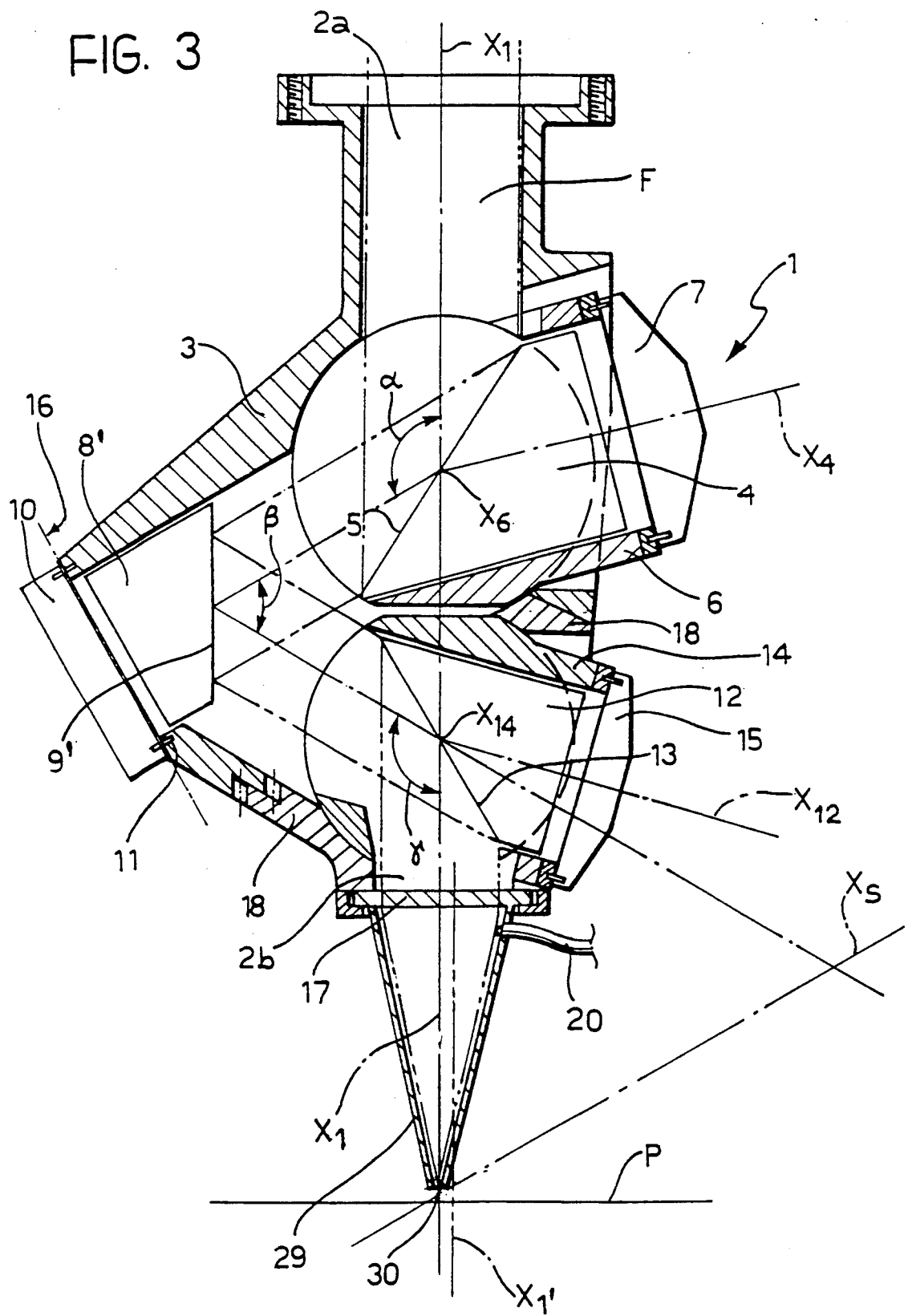

APPARATUS FOR MANIPULATING LASER BEAMS, PARTICULARLY POWER LASER BEAMS FOR USE BY ROBOTS

BACKGROUND OF THE INVENTION

1. Field of the Invention

The present invention relates to apparatus for manipulating (typically focussing) laser beams and has been developed with particular attention to its use in robot systems for cutting, welding, etc.

2. Description of the Prior Art

In this context, both lens systems and mirror systems are known for focussing power laser beams.

Lens systems generally have the disadvantage that they are very vulnerable to phenomena such as scratching, etc. which make it necessary for the damaged lenses to be replaced completely.

Mirror focussing system, for example with parabolic mirrors, have the advantage in this respect that, if they have superficial scratching, they can be polished which can restore the mirror surfaces to the desired operative conditions. On the other hand, mirror focussing systems give rise to greater operative difficulties both as regards the focussing of the beam along the axis of the robot hand or wrist (with consequent repercussions on the numerical control of the robot's movements along its various axes) and because of the need to arrange the various mirrors in very strict optical alignment along the radiation path.

SUMMARY OF THE INVENTION

The object of the present invention is to provide a powered-mirror device for manipulating laser beams which does not give rise to the aforementioned disadvantages. A further object of the present invention is to provide improvements in the distribution of the so-called screening gas in the region subject to the action of the laser beam.

According to the invention, this object is achieved by virtue of apparatus having the characteristics quoted in the claims which follow.

BRIEF DESCRIPTION OF THE DRAWINGS

The invention will now be described, purely by way of non-limiting example with reference to the appended drawings, in which:

FIG. 3 shows a second embodiment of the apparatus according to the invention which is particularly applicable to an automated cutting system.

In FIGS. 2 and 3, apparatus for manipulating (focussing) power laser beams generally indicated 1 is intended to be mounted, according to widely known criteria, on the movable end (the so-called hand) of a robot, not shown as a whole.

DESCRIPTION OF THE PREFERRED EMBODIMENTS

Figure 1:
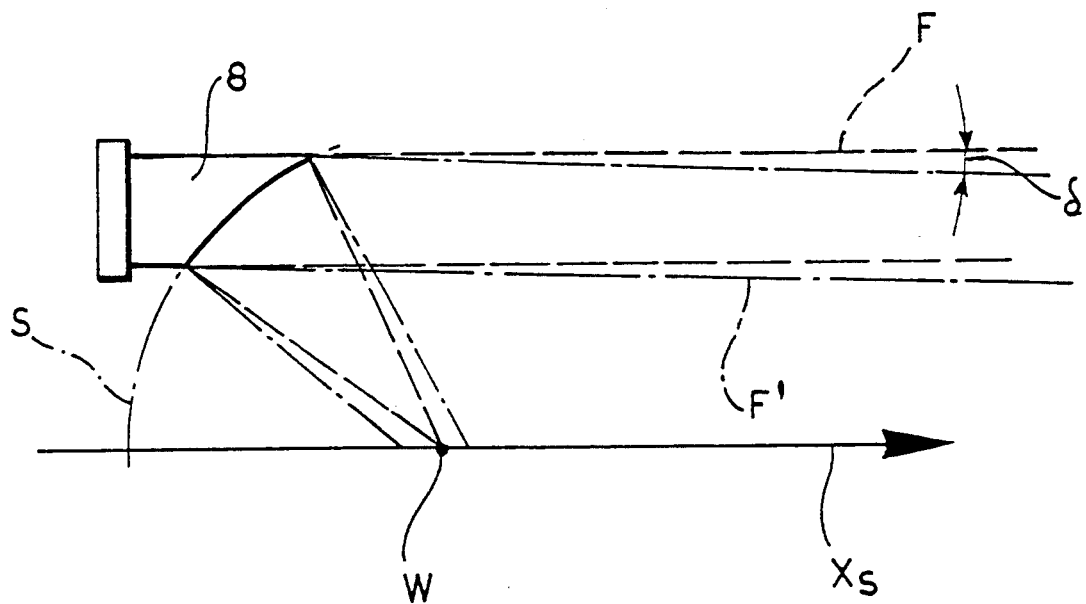
FIG. 1 shows schematically the general principle of the operation of focussing apparatus with a parabolic mirror.

In general, this hand has a principal reference axis $X_1$ which is intended to be kept generally perpendicular to the surface P which is being treated. The axis $X_1$ also constitutes the principal axis of a power laser radiation beam which enters the device 1 through an inlet aperture $2a$ in the metal casing 3 which encloses the device 1. The same casing 3 also has an outlet aperture $2b$, also substantially aligned with the axis $X_1$, at its end opposite the aperture 2, that is at the end which is intended to face the surface P being treated.

Drive means (not shown) are generally associated with the robot hand and enable the casing 3, and thus the device 1 as a whole, to be rotated about the axis $X_1$.

A first mirror, indicated 4, has a flat reflective surface 5 located in the path of the laser beam which enters the apparatus 1 through the inlet aperture $2a$.

The mirror 4 is produced according to known criteria which do not need to be described in detail, particularly as regards the provision of cooling means.

For the purposes of an understanding of the invention, the mirror may be considered to be produced, in theory, by the cutting of a cylindrical body with a principal axis $X_4$ along a plane generally inclined to the axis $X_4$: the inclined plane defines the surface 5 which is made reflective by a polishing treatment of known type.

The reflective mirror 4 is mounted in a respective adjustment assembly so as to be rotatable about its principal axis $X_4$ as a result of an adjustment action which can be carried out manually by means of a knob 7 or, alternatively, automatically by drive means not shown.

Figure 2:
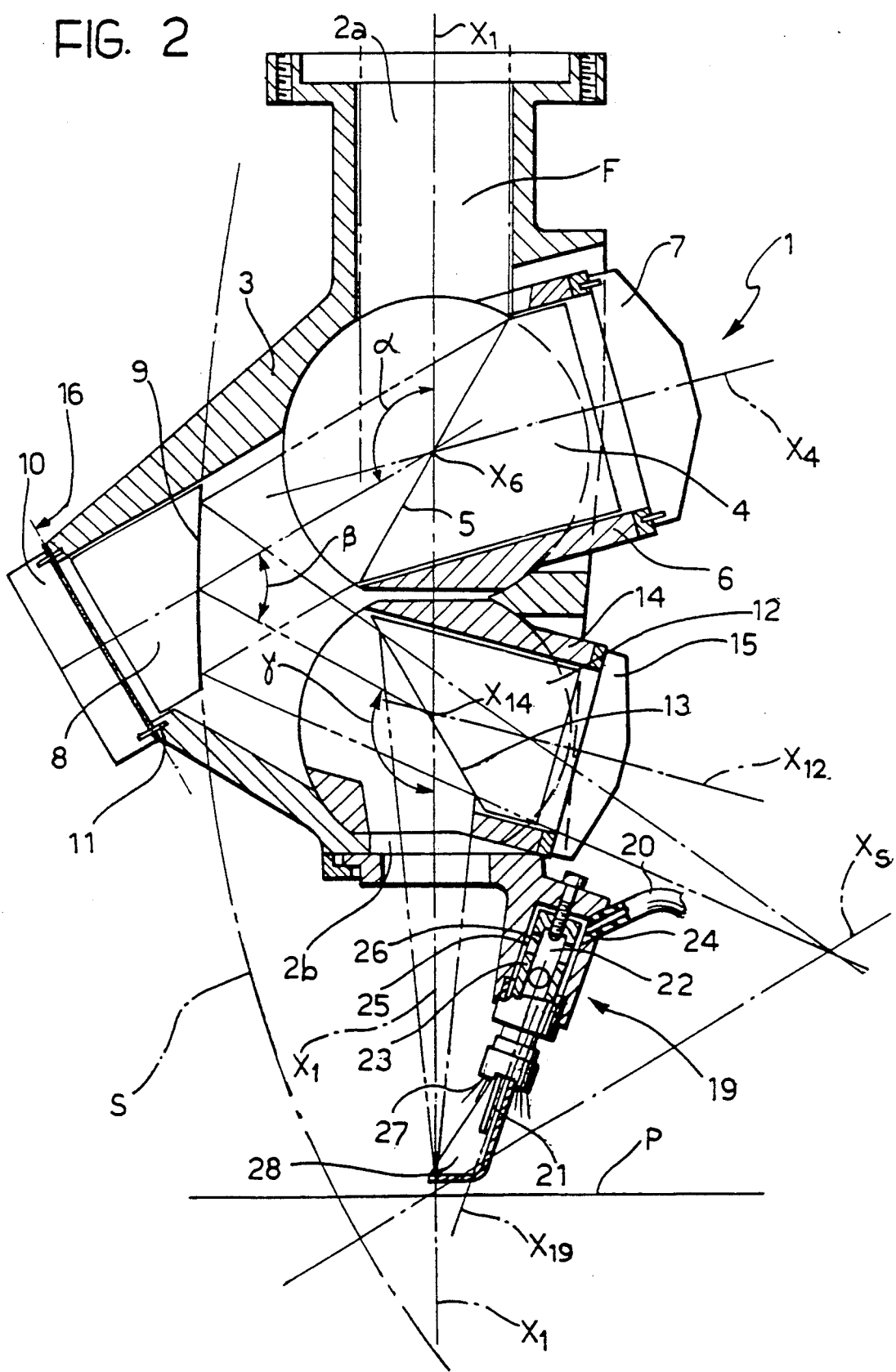
FIG. 2 shows a first embodiment of apparatus according to the invention intended, in particular, for use in an automated welding system.

The adjustment assembly 6 is mounted in the casing 3, for example by form coupling, so as to be generally pivotable about an axis $X_6$ which intersects the axes $X_1$ and $X_4$ at a point situated on the reflective surface 5; the axis $X_6$ is generally perpendicular to the axes $X_1$, $X_4$, that is, perpendicular to the plane of the paper as seen in FIG. 2.

The function of the mirror 4 is to deflect the laser beam, which is propagated in the direction indicated by the axis $X_1$, away from its original direction of propagation through an angle $\alpha$ of a magnitude of the order of 120° C.

Naturally, the magnitude of the angle of reflection, like that of similar angles defined below, refers to the angle between the incident beam and the reflected beam.

As a result of its reflection by the flat surface 5 of the mirror 4, the laser beam is deflected towards a further mirror 8 with a reflective surface 9.

The surface 9 extends over an imaginary parabolic surface S (indicated in chain line) whose principal axis $X_S$ is parallel to the line joining the central point on the reflective surface 5 (which identifies the intersection of the axes $X_1$, $X_4$ and $X_6$) and the central point on the reflective surface 9.

The mirror 8 (which is referred to in the following description simply as the parabolic mirror) is mounted in a fixed position relative to the casing 3 but can be separated from the apparatus 1 by a pull on its base support 10 which is fixed to the casing 3 by means of fixing elements such as screws 11 or the like.

The parabolic mirror 8 is mounted on the casing 3 of the apparatus 1 so that its reflective parabolic surface 9 extends generally in a direction which is approximately parallel to the initial direction of propagation of the beam, identified by the axis $X_1$.

The parabolic mirror 9 reflects the laser beam through a further angle $\beta$ of approximately 60° which returns the beam towards its original direction $X_1$ of propagation until it falls on a further flat mirror 12 mounted in the casing 3 in an arrangement substantially similar to the arrangement of the flat mirror 4 but in a complementary orientation.

More specifically, the mirror 12 can also be seen as being produced by the theoretical cutting of a cylindrical body with a principal axis $X_{12}$ along the inclined plane which identifies the reflective surface 13 of the mirror.

The mirror 12 is mounted on a respective adjustment device 14 so as to be rotatable about the axis $X_{14}$.

The device 14 is in turn movable relative to the casing 3 so as to be able to pivot about an adjustment axis $X_{14}$ which intersects the axes $X_1$ and $X_{12}$ which are both incident at point situated on the reflective surface 13. The axis $X_{14}$ is perpendicular to the axes $X_1$ and $X_{12}$.

In this case the position of the mirror 12 can also be adjusted manually by means of a knob 15 or, alternatively, automatically by drive means not shown.

The function of the mirror 12 is essentially to reflect the laser beam coming from the parabolic mirror 8 and to deflect it through an angle $\gamma$ of the order of 120°, returning it into alignment with its original direction $X_1$ of propagation.

In practice, after reflection by the flat mirror 12, the laser beam is again propagated in alignment with the axis $X_1$ and emerges from the device 1 through the outlet aperture 2b.

The presence of the parabolic mirror means that, as it travels along its path within the device 1, the laser beam is also focussed.

This effect is shown schematically in FIG. 1 where it can be seen that the beam F, which initially is propagated parallel to the axis $X_S$ of the parabolic surface 9 of the mirror 8 and strikes the parabolic mirror 8, is focussed on a point W.

Obviously, the flat mirrors 4 and 12 do not take part in the focussing mechanism. Their function is instead to bend, so-to-speak, the two branches of the path of propagation of the beam F, upstream and downstream of a parabolic mirror 8 respectively, so that the overall path of propagation is a straight line, aligned with the axis $X_1$, with a single "chicane" deflection in correspondence with the position of the mirror 8.

Any error in the parallelism of the direction of propagation of the beam F and the axis $X_1$ at the inlet of the device thus leads to an error in the focussing of the beam, as shown schematically in FIG. 1, where the path of propagation of a beam which is incident on the parabolic mirror 8 at an angle $\delta$ other than zero to the direction given by the axis $X_S$ of the parabola is indicated schematically in chain line at F'.

In this case the beam reflected from the parabolic mirror 8 is dispersed around the focus W of the parabola instead of being focussed on it.

The fact that the mirror 4 can be adjusted (that is, the device 6 on which the mirror is mounted can be pivoted about its axis $X_6$ and the mirror 4 can also be rotated about its principal axis $X_4$) enables the necessary parallelism to be achieved between the direction of propagation of the beam which is incident on the parabolic mirror 8 and the axis $X_S$ of the parabola which defines the reflective surface 9 of the mirror.

More particularly, for the adjustment to be made, the mirror 8 can be removed from the casing 3 of the device and a flat mirror can be arranged in the reference plane 16 indicated by a thick line in FIG. 2. The reference plane is generally perpendicular to the direction of propagation of the beam reflected from the first flat mirror 4: it is thus possible to check (for example with a low-power He-Ne test-laser generator) that the laser beam injected into the apparatus 1 through the aperture 2a, after reflection from the surface 5 of the mirror 4 and the reflective surface of the flat test mirror 16 so as to be returned and reflected again by the surface 5 of the mirror 4, emerges correctly from the inlet aperture 2a of the apparatus exactly parallel to its initial direction of propagation. This condition can be found by the selective adjustment of the flat mirror 4 (axis $X_4$, axis $X_6$) until the correct position of adjustment has been achieved.

A similar adjustment of the mirror 12 (in this case also by rotation of the mirror about its principal axis $X_{12}$ and of the respective adjustment device about its axis $X_{14}$) enables the beam emerging from the apparatus through the outlet aperture 2b to be focussed on the surface P under treatment in alignment with the axis $X_1$.

The solution shown in FIG. 3, which is intended mainly for application to a laser cutter, shows how two variants can be used in a structure generally identical to that described above with reference to FIG. 2.

The first variant concerns the possibility of replacing the parabolic mirror 8 by a flat mirror 8', that is, by a mirror whose reflective surface 9', whilst retaining an orientation generally identical to that of the reflective surface 9 of the parabolic mirror 8 of FIG. 2, is flat. Naturally, in this case, the desired focussing effect is not achieved by reflection and must therefore be achieved by a lens 17 arranged in correspondence with the outlet aperture 2b.

The second variant concerns the possibility of mounting the outlet assembly of the apparatus, constituted by the flat mirror 14 and the members associated therewith (including the lens 17, if any), on an assembly 18 which is translatable generally parallel to the beam leaving the mirror 8'. The movement of the flat output mirror 12 enables the laser beam emerging from the device to be propagated (and focussed) along an axis $X_1'$ parallel to the principal axis $X_1$. This means that, when the device 1 is rotated about the principal axis $X_1$, the focal point of the laser beam output thereby describes a generally annular path about the axis $X_1$. This capability, which is used, for example, in laser cutting operations, enables cutting to be carried out along a circular path, not just at a point.

Whichever solution is adopted, it can immediately be seen that the apparatus according to the invention enables the position of the focal point of the output laser beam to be adjusted precisely. This solution is found to be particularly advantageous in the reconfiguration of a robot laser, originally designed to operate with a lens focussing system, for use with a mirror focussing system.

Generally, the replacement of lenses by mirrors would require a complete redifinition of the programs for controlling the movements of the robot. With the use of a system according to the invention, it suffices for the focussing (particularly of the output mirror 12) to be finely tuned (with the further possibility that the device may be arranged at will either as a laser cutting unit or as a welding unit), the control logic for the movement remaining unchanged.

As is known, the interaction of a focussed power laser beam with a metal surface causes a hole (known as a "key-hole") to be formed in the bath of molten metal. Metal vapours currently known as "plumes" are released from the key-hole and must be removed from the working zone to prevent adverse effects.

It is known to blow inert gases into the region under treatment in order to remove the "plume".

Very often, however, the inert gases entrain a certain amount of air (and hence oxygen), causing oxidation and defects.

FIG. 2 shows improved apparatus generally indicated 19, which enables inert gas to be blown in to screen the region P on which the laser beam is acting without giving rise to the problems quoted above.

The solution shown in FIG. 2 has been illustrated, in particular, with a view to its use in a welding system.

Essentially, the device 19 is constituted by a tubular nozzle with an inlet duct 20 to which an inert gas is supplied under pressure (for example 2-3 bars).

The nozzle in question includes a central duct 21 which communicates with the inlet duct 20 through a cylindrical chamber 22. More precisely, the wall 23 of the chamber 22 is surrounded by an outer cylindrical casing 24 which creates an outer annular chamber 25 into which the inlet duct 20 opens. The outer chamber 25 communicates with the inner chamber 22 through ducts 26 provided in the wall 23.

As well as the central duct 21, on its side facing the surface P, the nozzle has an outer opening 27 for ejecting the gas, which is usually closed by a gas-permeable metal gauze which surrounds the central duct 21 at a certain distance from its free end.

The nozzle 19 is mounted on the device 1 so that its principal axis $X_{19}$ is at an angle of the order of 30° to the principal axis $X_1$.

The free end of the central nozzle 21 is intended to face the surface P and to be kept at a short distance from that surface. The end is surrounded by a bowl- or spoon-shaped deflector 28 with an end part which extends approximately parallel to the surface P.

The pressurised inert gas supplied through the inlet duct 20 is thus divided into two flows, that is to say:

a central flow which passes through the central nozzle 21 into the deflector 28 to be deflected in a direction perpendicular to the direction $X_1$ of propagation of the beam so as to flow over the surface P parallel to the surface P itself, and an outer flow constituted by the gas which emerges from the nozzle 19 through the ring 27.

The first, central inert-gas flow essentially has the function of removing the plume. The second flow, however, has the function of creating a ring of inert gas around the region under treatment. The gas which forms this ring, which will be entrained away from the working region with the removal of the plume by the first flow, acts positively to prevent air and oxygen from penetrating that region.

The variant of FIG. 3 (which is preferably intended to be used for cutting operations in which it is essential that the screening gas reaches the surface in a direction perpendicular to the surface) on the other hand, provides for the inert-gas supply duct 20 to open into a hollow conical body 29 which surrounds the outlet aperture 2b of the device.

The casing 29 is mounted on the movable body 18 so that it remains coaxial with the beam emerging from the device under all conditions.

At its lower end, the body 29 has a small aperture 30 (for example of the order of two millimeters) which is intended to surround the focussed beam which strikes the surface P. The casing 29 in practice behaves like a nozzle which projects the inert gas supplied through the opening 20 on to the region under treatment, the direction of blowing being perpendicular to the surface P.

What is claimed is:

1. Apparatus for manipulating laser beams, intended to receive a laser beam which is propagated in a given direction and to transmit it substantially in alignment with that direction, wherein it comprises:

first reflective means, whose position is adjustable, arranged to receive said laser beam and to deflect it for a first time through a first given angle away from said given direction, second reflective means arranged to receive said beam deflected by said first reflective means and to deflect it for a second time through a second given angle towards said given direction, and third reflective means, whose position is adjustable, arranged to receive said laser beam deflected by said second reflective means and to deflect it for a third time through a third given angle to a condition in which it is aligned with said given direction.

2. Apparatus as claimed in claim 1, wherein said first given angle, said second given angle and said third given angle have magnitudes defined between the respective incident beam and the respective deflected beam of 120°, 60° and 120° respectively.

3. Apparatus as claimed in claim 1, wherein said first reflective means and said third reflective means have flat reflective surfaces.

4. Apparatus as claimed in claim 3, wherein said flat reflective surfaces are defined theoretically by the intersection of a plane with a cylinder of given principal axis, the plane being inclined to the principal axis.

5. Apparatus as claimed in claim 4, wherein each of said first and third reflective means is mounted for rotation of its reflective surface about the principal axis of the respective cylinder.

6. Apparatus as claimed in claim 4, wherein said first and third reflective means have associated adjustment means which can pivot the respective flat reflective surfaces about axes perpendicular to the principal axes of the respective cylinders.

7. Apparatus as claimed in claim 1, wherein said second reflective means have a parabolic reflective surface which can focus the laser beam.

8. Apparatus as claimed in claim 1, wherein it includes a housing for traversal by said laser beam, said housing defining an inlet aperture for said laser beam; said second reflective means are selectively removable from said housing leaving accessible a reference plane generally perpendicular to the direction of propagation of the beam deflected once by said first reflective means; and wherein flat, reflective calibration means are provided for location in said reference plane to enable the adjustment of said first reflective means by observation of the back-reflection of radiation directed into said housing through said inlet aperture.

9. Apparatus as claimed in claim 1, wherein said second reflective means have a flat reflective surface and lens means are provided for focussing said laser beam.

10. Apparatus as claimed in claim 9, wherein said lens means are arranged downstream of said third reflective means in the path of propagation of said laser beam through said apparatus.

11. Apparatus as claimed in claim 1, wherein said third reflective means are mounted for translational movement in the general direction of propagation of said laser beam deflected for the second time by said second reflective means, the translation of said third reflective means enabling the path of propagation of said laser beam deflected for the third time by said third reflective means to be translated selectively from said given direction into a position such that, upon rotation of said apparatus around said given direction, a generally circular path of movement is imparted to said laser beam deflected for the third time by the third reflective means.

12. Apparatus as claimed in claim 1, particularly for applications in which the interaction of the said laser beam which has been manipulated by said apparatus with a region of a surface to be treated gives rise to fumes which are removed by the blowing of gas on to said surface region under treatment, wherein said apparatus further includes means for distributing said gas, provided with:
   first blow duct means with associated deflector means for producing a gas flow close to said surface region and parallel to said surface for removing said fumes, and
   second blow duct means for creating, around said region, a ring of gas which can be entrained by said gas flow parallel to said surface substantially without drawing air towards said region.

13. Apparatus as claimed in claim 12, wherein said first blow duct means are defined essentially by a tubular duct generally inclined to said given direction and wherein said second blow duct means are defined by at least one gas-ejection aperture which surrounds said tubular duct.

14. Apparatus as claimed in claim 12, wherein said deflector means are generally bowl- or spoon-shaped.

15. Apparatus as claimed in claim 1, wherein it includes a housing for traversal by said laser beam defining an outlet aperture for said laser beam, said outlet being intended, in use, to face a surface to be treated and wherein it includes a nozzle element which is generally tapered from the outlet aperture towards said surface and wherein means are also provided for blowing gas under pressure into said nozzle element in order to direct a gas flow oriented substantially in said give direction onto said surface.

16. Apparatus as claimed in claim 15, wherein partition means are provided for substantially sealing said nozzle element from the housing.

17. Apparatus as claimed in claim 16, wherein said second reflective means have a flat reflective surface and lens means are provided for focussing said laser beam, and wherein said partition means are constituted by said lens means.

18. Apparatus as claimed in claim 1 wherein said second reflective means extends generally in a direction approximately parallel to said given direction.

19. Apparatus as claimed in claim 18 wherein said first given angle, said second given angle and said third given angle have magnitudes defined between the respective incident beam of the respective deflected beam of approximately 120°, 60° and 120° respectively.

20. Apparatus as claimed in claim 18 wherein said second reflective means is provided with a parabolic reflective surface which can focus the laser beam.

* * * * *